Oct. 5, 1965 C. H. NORDELL ETAL 3,209,914
SCREEN AND RAKE COMBINATION FOR REMOVING SOLIDS FROM LIQUIDS
Filed Aug. 15, 1961 6 Sheets-Sheet 1

INVENTORS
RICHARD M. MILLSPAUGH
BY AND CARL H. NORDELL
Horton, Davis,
Brewer & Brugman
ATT'YS.

Oct. 5, 1965 C. H. NORDELL ETAL 3,209,914
SCREEN AND RAKE COMBINATION FOR REMOVING SOLIDS FROM LIQUIDS
Filed Aug. 15, 1961 6 Sheets-Sheet 2
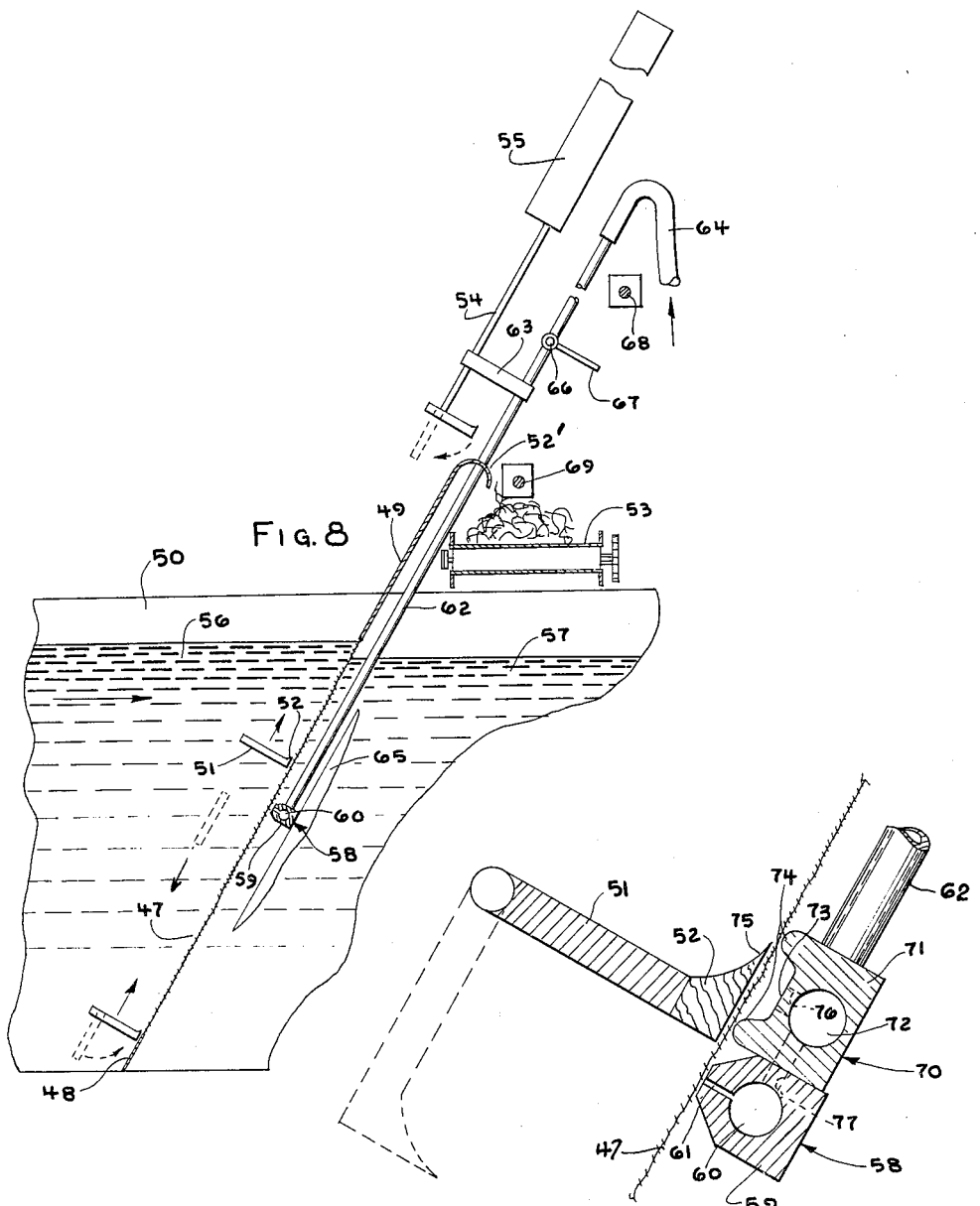
INVENTORS
RICHARD M. MILLSPAUGH
BY AND CARL H. NORDELL
Horton, Davis,
Brewer & Brugman
ATT'YS.

Oct. 5, 1965 C. H. NORDELL ETAL 3,209,914
SCREEN AND RAKE COMBINATION FOR REMOVING SOLIDS FROM LIQUIDS
Filed Aug. 15, 1961 6 Sheets-Sheet 3

INVENTORS
RICHARD M. MILLSPAUGH
BY AND CARL H. NORDELL
Horton, Davis,
Brewer & Brugman
ATT'YS.

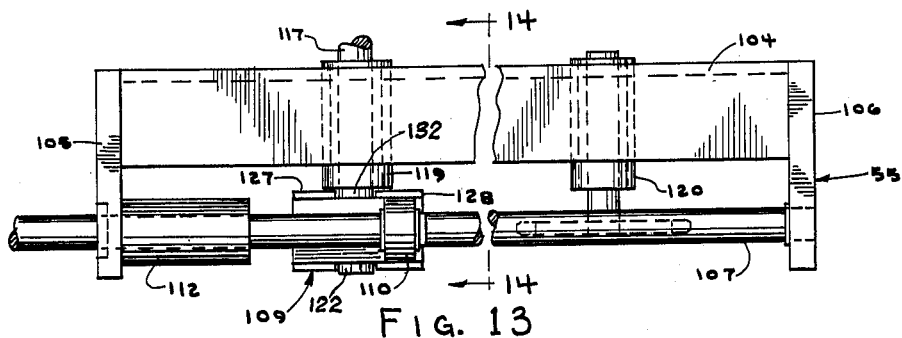
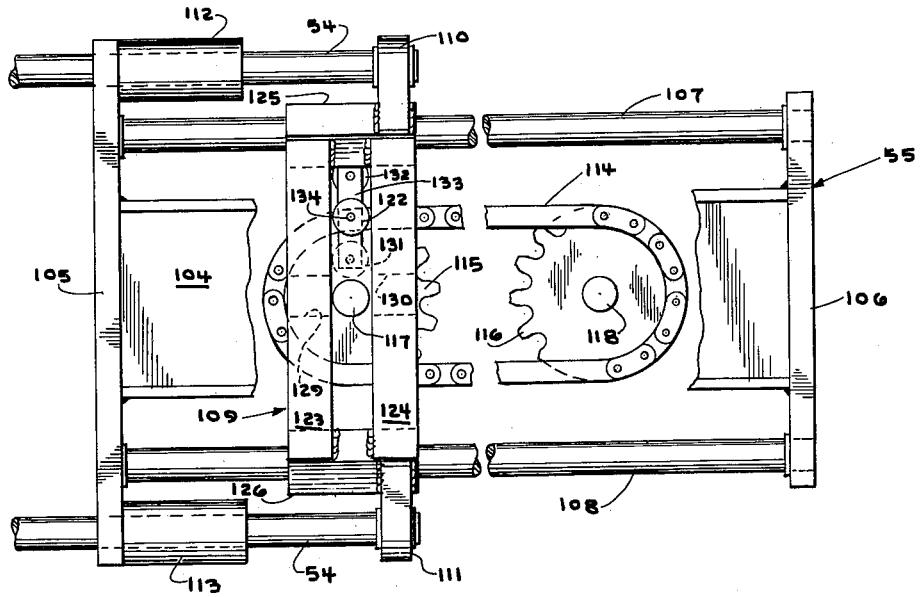

Oct. 5, 1965 C. H. NORDELL ETAL 3,209,914
SCREEN AND RAKE COMBINATION FOR REMOVING SOLIDS FROM LIQUIDS
Filed Aug. 15, 1961 6 Sheets-Sheet 5
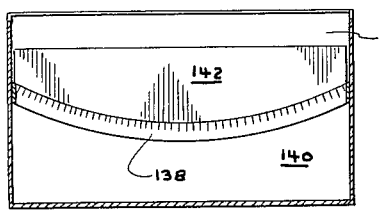
FIG. 16
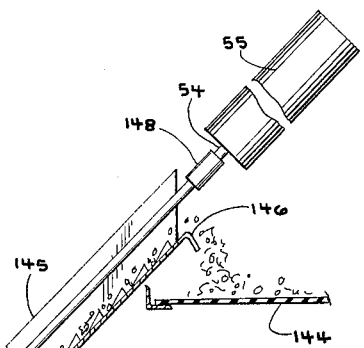
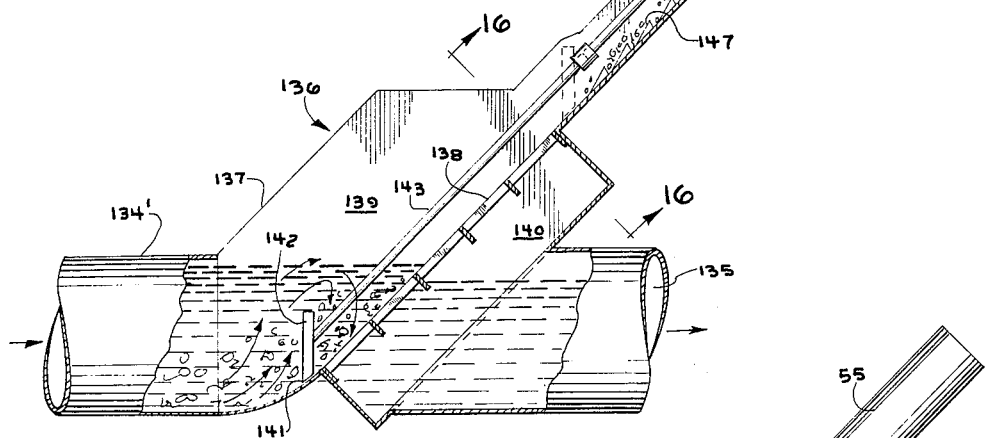
FIG. 15
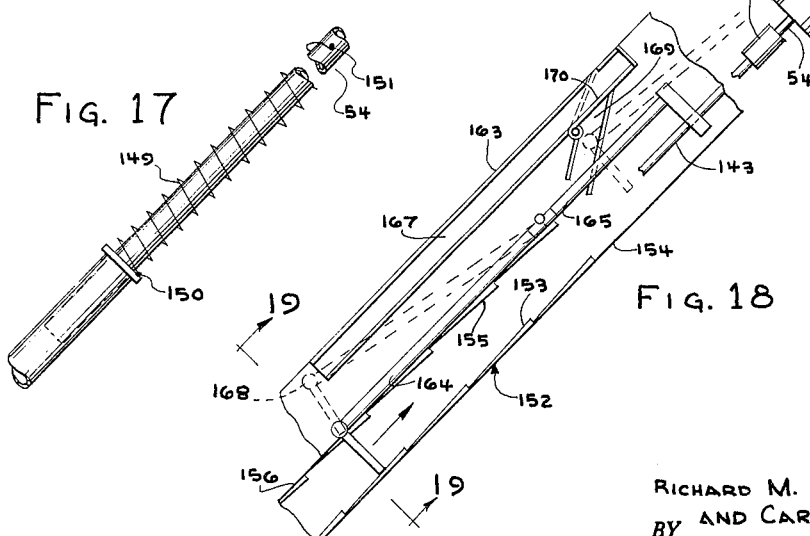
FIG. 17 FIG. 18
INVENTORS
RICHARD M. MILLSPAUGH
AND CARL H. NORDELL
BY
Norton, Davis,
Brewer & Bragman
ATT'YS.

Oct. 5, 1965  C. H. NORDELL ETAL  3,209,914
SCREEN AND RAKE COMBINATION FOR REMOVING SOLIDS FROM LIQUIDS
Filed Aug. 15, 1961  6 Sheets-Sheet 6

INVENTORS
RICHARD M. MILLSPAUGH
AND CARL H. NORDELL
BY
Horton, Davis,
Brewers Brugman
ATT'YS.

United States Patent Office 3,209,914
Patented Oct. 5, 1965

3,209,914
SCREEN AND RAKE COMBINATION FOR REMOVING SOLIDS FROM LIQUIDS
Carl H. Nordell, Crystal Bay, Lake Tahoe, Nev., and Richard N. Millspaugh, 4040 Pine Ave., Long Beach, Calif.
Filed Aug. 15, 1961, Ser. No. 131,555
10 Claims. (Cl. 210—159)

This invention relates to the art of removing solids from water or other liquids by screening or straining. It will be described for purposes of illustration as applied to a stream of water such as a river or creek, a portion of which may be diverted to a power plant, chemical processing plant or the like for use as a cooling, washing or diluting agent. It may, of course, be used in other application such as sewage disposal plants, or the like.

Screens used to remove solids from water are of two general types, viz., fixed and movable. Both are mounted in such manner in the stream of water to be screened that the entire stream of water must pass through them. As the water moves through the screen, those solids in the water which are too large to pass through the openings in the screen accumulate on the upstream side of the screen and block the progress of the water through the screen, thus making necessary the use of some means for removing the accumulated solids to clear the screen.

The moving screen is usually either a sloping endless belt or a horizontal cylinder partly immersed in the water. As the screen surface rotates upwardly out of the water the debris adhering to it is likewise raised out of the water and then brushed or washed off. The fixed screen, in general, extends upwardly out of the stream, and the debris accumulated thereon is raked or scraped to the upper end of the screen from whence it is pushed off and allowed to fall into a prepared receptacle or conveyor.

The solids which burden water are of many diverse consistencies and sizes. They may be as small as seeds, plankton or sand, which can only be strained out by the finest wire cloth, with openings only a few thousands of an inch in average transverse dimension. On the other hand, they may be trash such as leaves, paper, weeds, sticks, etc., together with coarse sand or gravel and large objects of great variety. Since the large, heavy objects might damage a fine screen designed to separate out small, light or soft particles, it is customary to remove solids from water in which large objects might be found by using two screening stations, the first having sufficient strength to withstand the impact and abrasion of large, heavy objects, and the second being designed to remove the fine particles.

For efficient cleaning the screen openings should approximate as closely as possible a sharp edged orifice. If perforated plate is used, the openings can be machined to this form, but at greatly augmented cost, but when wire cloth is employed, no matching is possible. For this reason the wire cloth must be as thin as possible to clean well, and when the openings are to be only a few thousandths in the clear, the fabric is of necessity very thin. As water flows through the screen, there is a drop in pressure. This pressure differential exerts stress on the screen and if the screen is thin, it has heretofore been necessary to support the screen with a stout wire mesh having coarser openings, and strong enough to withstand the expected stresses. This not only entails extra expense, but diminishes the permeability of the screen, since some of its opnings are blocked off by the support. Furthermore, as a practical matter, it is difficult to get the thin screening surface to lie smooth and tight on the supporting mesh, and any separation between them, however slight, catches and holds fibrous material which is difficult to remove.

Screens that are intended to remove larger objects only, usually called "coarse screens" or "racks" are usually formed of parallel bars instead of either wire mesh or perforated plate. The water passage between the bars is not too readily cleaned unless it has divergent sides so that any object entering it encounters an ever-widening passage; for then the flowing water can readily propel it completely through. Heretofore, this desirable form of passage could be realized only if the bars were made wedge shaped in cross section, which entailed special bars and somewhat greater difficulty in fastening them in the cross members. Moreover, a wedge section is only possible if theb ars are of substantial thickness, which in turn requires that the openings between them be equally substantial, otherwise the percentage of open area available for water flow might be rather small. If the openings between the bars are on the order of ¼", the bars should be only about ⅒ of this or less in thickness to realize the full advantage of 90% open area. If, on the other hand, divergent passages are not feasible, resort must be had to other devices such as the use of resiliently secured bars which "work" sufficiently to release anything that enters between them.

The principal object of this invention is to provide a screen of the fixed type for removing solids from water or other liquids wherein the screen, if of woven wire cloth or perforated sheet, may be made very thin and readily cleaned, and, if formed of parallel bars, may have divergent water passages even though the bars are of uniform thickness.

We have discovered that by changing the contour of a fixed screen from the usual flat contour to an arcuate contour, with the concave side presented to the oncoming stream, several important advantages result.

One advantage of the arcuate screen contour with the concave side presented to the oncoming stream is that the pressure of the stream will be evenly distributed over the screen surface in a radial direction with respect to the center of curvature of the screen, thus placing the screen itself under uniform tension rather than creating bending stresses therein. Since the wire cloth or perforated sheet of which a fine screen is made can withstand tensile stress better than bending stress, the screen can be made of thin material, and hence a more favorable ratio of length of opening to its diameter can be attained, whereby the cleanability of the screen is greatly enhanced.

A more specific object of this invention is the provision of a novel construction of fixed bar screen for screening out heavy objects from a stream of water or the like, wherein the screen is so constructed as to provide spaced vertically disposed slats or strips secured to arcuately shaped transverse supports, with the concave side of the screen presented to the oncoming stream, whereby the slats are made to diverge slightly from one another in the direction of flow and hence promote to a large extent the self-cleaning of the screen as to finer particles which normally tend to build up in the interstices between slats. Furthermore, the arcuate form insures that the supporting cross members that support and space the slats are stressed in tension only and may be made lighter in cross section than they would be if the screen surface were flat and the cross members served as beams.

Another advantage of the arcuate form is that the screen surface is always practically the same circular arc in cross section, so that the cleaning scraper or squeegee fits it closely regardless of whether it is being stressed lightly or more strongly by the fluctuating differential pressure. It will not change shape any more than a circular pipe will change shape with fluctuating internal pressure.

In addition to providing a fixed screen having greater strength and a large degree of self-cleanability, it is a further object of this invention to provide improved apparatus for cleaning a fixed screen wherein the accumulated debris is effectively loosened from the screen and moved upwardly through the flowing liquid over the top of the screen into a prepared receptacle, or upon a conveyor.

As a more specific object, this invention has within its purview the provision of an apparatus for removing debris of a pasty nature from a screen by loosening the debris, either by back flushing, or by establishing a pressure differential across the screen in an upstream direction, and then scraping or rolling the loosened debris upward off the screen and upon a conveyor.

A still more specific object of this invention is to provide a screen for removing large particles from a stream wherein the screen is very strong and yet presents approximately 90% of open area to the flow. As an ancillary object, this invention seeks to provide a trash screen which is so efficient that its vertical height can be limited to the height of the low water level in a stream, the space between the low and high water levels being taken up by a solid barrier which not only facilitates moving debris from the screen upward toward a point of discharge, but also permits the screen to be continuously submerged below the level of floating trash which is generally bulky and obdurate for the handling means, and thus serves to prolong the life of such screens.

These and other objects of this invention will become apparent from the following detailed description when taken together with accompanying drawings in which:

FIG. 8 is a diagrammatic side elevational view of a screen and cleaning assembly incorporating this invention, the assembly being shown installed in a stream of water to be cleaned;

FIG. 11 is a greatly enlarged fragmentary longitudinal section through the scraper and certain flushing apparatus used with the screen;

FIGS. 12 and 13 are, respectively, fragmentary bottom and side views of a reciprocating mechanism used with the scraper of FIG. 9;

FIG. 14 is a cross-section through the reciprocating mechanism of FIG. 13 taken along line 14—14 thereof and looking toward the left of FIG. 13;

FIG. 15 is a side elevational view, partly in section, of a grid type of screen and a scraper assembly therefor;

FIG. 16 is a cross-section through the screen of FIG. 15, on an enlarged scale;

FIG. 17 is a fragmentary side elevational view of a lost-motion mechanism used in connection with the scraper of FIGS. 8 and 15;

FIG. 18 is a diagrammatic side elevational view of a further modification of the scraper assembly;

Figure 1:
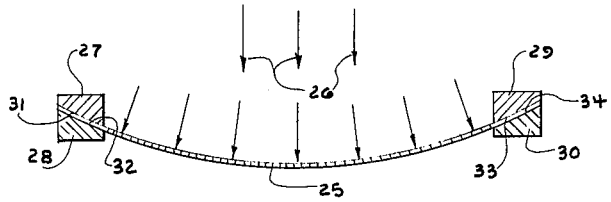
FIG. 1 is a cross-section through an arcuate screen and its side frame members.

Turning now to the drawings for a more detailed description of preferred embodiments of this invention, the broadest aspect is disclosed in FIG. 1 wherein a cross-section through a typical screen is shown. The screen 25 may be of the type used to remove relatively fine particles from a moving stream. It is contemplated that it will be inserted into a channel having substantially parallel sides and that the stream of water or other liquid in the channel will be moving downward as viewed in FIG. 1, in the direction of the arrows 26. Instead of presenting a planar surface to the oncoming stream, as has heretofore been the custom, screen 25 is bent to have an arcuate form such that transverse sections represent segments of a circle.

When the moving stream encounters the screen, its velocity through the interstices must be increased because the total are of flow is reduced by the area of the screen material. This increased velocity is accompanied by a drop in pressure through the screen so the pressure of the water on the downstream side is less than that on the upstream side. This pressure differential is practically uniform over the entire surface of the screen, and if this surface were flat, bending moments would result. Obviously, unless the screen were thick and strong beyond practical limits, it would distort and sag. However, if it is formed into a circular arc between the supports, it is stressed in tension only and its shape maintained. Essentially, the screen is then a segment of a cylinder subjected to uniform unit pressure acting radially outwardly, and it is the uniformity of the pressure which maintains its shape. If a thin cylindrical shell is subjected to internal water pressures and is totally immersed in water, it will maintain its circular form whether is stands vertically, lies horizontally, or is disposed at any intermediate angle; for the varying hydrostatic pressures due to immersed depth would be exactly balanced inside and out. Now, if the shell were sliced lengthwise and the unit internal pressures maintained by some means, the segment would keep its shape and the unit tensile stresses would remain the same as though the whole cylinder were still intact. Obviously, the sides of the segment along the slice would have to be supported in some manner to take the pull of the tensile stresses in the shell segment.

Thus it follows that if the screen is preformed to a circular arc in cross section and then is subjected to uniform radially outwardly directed pressure, it will maintain precisely its circular cross section, and the only stress in the shell will be simple tensile stress. This will be true no matter what the radius of the arc or what the pressure. It is true that as the pressure increases the tensile stress increases and the arc is thereby lengthened. This changes its radius slightly, but with the range of pressures on the screen as encountered in practice, the stretch of the screen metal is extremely slight and its effect unnoticeable. The unit tensile stress in the screen along the arc is always equal to the radius multiplied by the unit differential, just as the unit stress in a pipe under pressure is equal to the radius multiplied by the unit pressure. A practical radius for the arcuate screen is one equal to the width of the screen. The tensile stress is then the width multiplied by the unit pressure. If, for example, the width of the screen is 36" and the unit pressure is one pound per square inch, the tensile stress is 36 lbs. per lineal inch of screen. If the screen thickness is only .010" the unit stress in the perforated plate or woven wire, assuming half of its cross sectional area is metal, is only 7,200 p.s.i., and the elongation of the arc is only .010", which may be disregarded, since the scraper is not fitted with a tolerance this close. As far as strength to resist the differential pressure is concerned, the screen need be made only half of this thickness. It will be readily seen, therefore, that the arcuate form produces the important result of making less metal suffice than was formerly considered acceptable practice. The reduction in metal, in turn, results in greater efficiency in that where perforated sheet material is used, thinner material will suffice, which means that the ratio of diameter of a perforation to its length is more favorable to self-cleaning. Where woven wire material is used, the total open area may be greater for a given size and fineness of screen, and the same is true of the grid type of screen.

The arcuate shape is imparted to the screen 25 by rolling and cooperating pairs of clamping guides 27, 28 and 29, 30 disposed along the sides of the screen 25. Each guide 27, 28 has complementary confronting curved surfaces 31, 32, the center of curvature of which is the same as that of the arcuate screen 25, and the edge regions of the screen are clamped between such complimentary curved surfaces to assist in giving the entire screen its arcuate cross section. Similar complementary confronting curved surfaces 33, 34 are formed on guides 29, 30.

It is contemplated that the pairs of guides 27, 28 and 29, 30 will be appropriately fastened together in clamping relation to the screen and that the pairs of guides will be secured to frame members in the stream channel. The spacing between the guides and the width of the screen will determine the degree of curvature of the screen, as will also top and bottom plates extending across the channel and secured to the top and bottom regions of the screen, as hereinafter set forth in greater detail.

Figure 2:
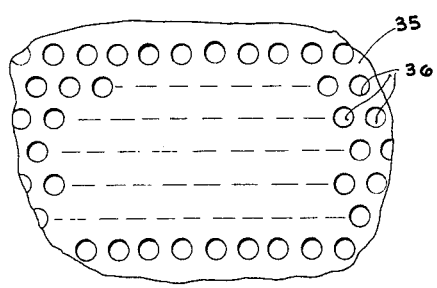
FIG. 2 is a greatly enlarged fragmentary plan view of a screen made of perforated sheet material.
Figure 3:
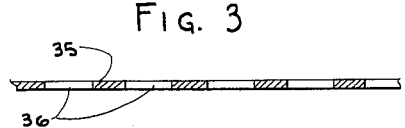
FIG. 3 is a cross-section through a perforated screen of the type shown in FIG. 2.
Figure 4:
FIG. 4 is a cross-section through a woven wire screen.

The arcuate form may be applied to screens made of perforated sheet metal of the type shown in FIGS. 2 and 3. Said screen 35 may be 36" wide and made of stainless sheet .005" thick having perforations 36 therethrough. Alteranatively, the arcuate form may be applied to wire cloth 37 (FIG. 4) which is ideal for very fine screening.

Because of the thinness of the screen material the pressure differential across the screen causes the material to inflate and bulge out toward the downstream side of the screen. The said screen tends to form itself in a perfectly circular arc without requiring the use of a heavy sustaining or form-giving mesh structure adjacent the screen. If the screen material is initially rolled into the desired arcuate shape, such shape is preserved in use without kinking.

The extreme thinness of the screen material made possible by the arcuate shape is of paramount importance in promoting cleanability of the screen. Obviously, the less the water passages or interstices of the screen resemble short tubes and the more they resemble sharp-edged orifices, the less possibility there exists for the screen to become plugged with debris. Since there is little opportunity for debris to be firmly lodged in the passages or interstices, the surface of the screen can be wiped clean by a simple squeegee. Any debris which is pushed into the interstices by the squeegee is readily removed by the pressure of the water as it passes through such interstices. When such natural pressure is not sufficient, a moderate back-flushing will be sufficient. Although wire cloth does not present openings which have quite the ideal cleanability characteristics of perforated sheet material, it may nevertheless also be wiped clean with a squeegee.

Figure 5:
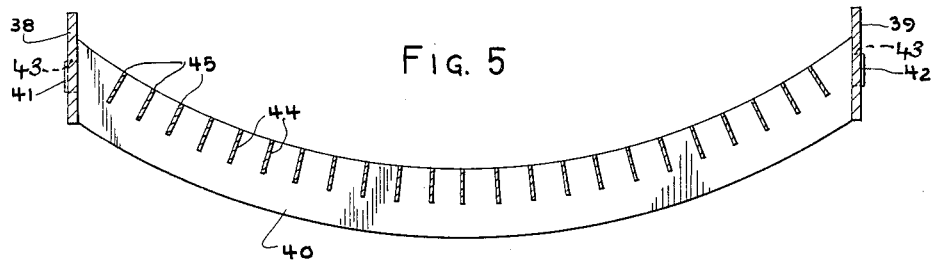
FIG. 5 is a cross-section through a bar type of screen having the novel arcuate form of this invention.
Figure 7:
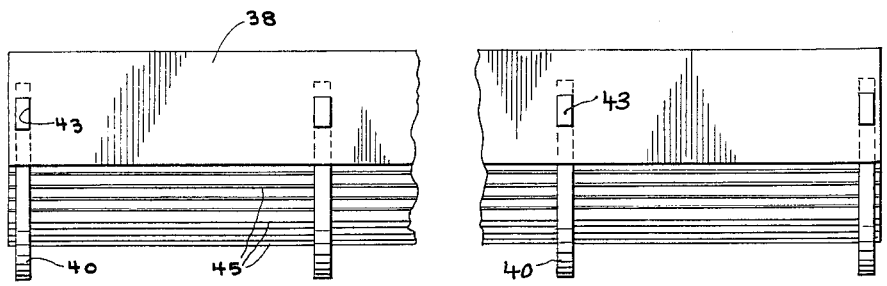
FIG. 7 is a side elevational view of the grid type of screen of FIG. 5.
Figure 6:
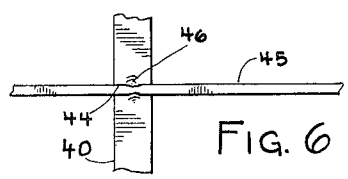
FIG. 6 is a greatly enlarged fragmentary plan view of a slat and its support, of the bar type of screen of FIG. 5, showing the method of securing the slat to its support.

When the screen is to be used to remove solids too heavy to be safely intercepted by wire cloth or perforated sheet metal, the grid form shown in FIGS. 5, 6 and 7 may be used. In this form, the screen is comprised of spaced, substantially parallel side plates 38, 39 to which are secured arcuately shaped bars 40. The ends of the bars 41 and 42 may be mortised into suitable rectangular openings 43 in plates 38, 39 which prevent the bars from turning relative to the plates, and the said ends 41, 42 may then be welded or riveted to their respective plates.

The concave sides of the bars 40 have equiangularly disposed slots 44 milled thereinto, said slots radiating from the center of curvature of the concave side of the bars 40. Thin slats or strips 45 are inserted into slots 44 and, as shown at 46 in FIG. 6, the edges of the slots are deformed inwardly over the slat to "stake" the slats in place. Because the slots radiate from a common center, the slats disposed therein are not parallel to one another and adjacent pairs of slats therefore diverge slightly toward the convex or downstream side of the screen, thus defining openings which are progressively larger toward the outlet sides thereof. Such openings are self-cleaning so that the grid form of screen may also be readily cleaned by a simple squeegee action, any material wiped by the squeegee into the openings being readily pushed through by the pressure differential across the screen, provided by the moving stream.

The grid form of screen is preferred where the nature of the cleaning operation is such that the size of the opening deemed acceptable is ¼" or more. Such grid form can be made very strong and still present 90% of open area to the flow in contrast to the 40% to 60% of open area provided by a wire cloth or perforated sheet of not quite equal strength. This is because the metal slats can be made strong in depth and still present only thin edges to the flow. Thus slats of only 0.020" thickness are entirely practical for the grid form. The bars 40 may also be made thinner, or alternatively, may be more widely spaced since, as hereinabove described, the arcuate form of screen places the bars in tension rather than imposes bending stresses and hence enables a lesser section to suffice for the same stream conditions.

The fact that an arcuate screen may be cleaned by a simple squeegee operation makes it possible to fix such screens in place and use scrapers which are reciprocated over the screen to move the accumulated debris upward and then over the top of the screen upon a chute or conveyor. One such installation is shown diagrammatically in FIG. 8. The screen there depicted may be of the woven wire type which is used for relatively fine matter. The screen is shown at 47 and is mounted in a frame which includes the side clamping guides shown in FIG. 1 and bottom and top horizontal plates 48, 49. Said plates 48, 49 have the same arcuate curvature as the screen in FIG. 1, and constitute extensions of the screen.

The screen 47 and its frame are mounted in and extend across a channel 50 through which the water, or other liquid to be cleaned, flows from left to right as viewed in FIG. 8. Said screen and its frame are inclined backwardly as shown in FIG. 8 to facilitate the removal of the debris, the inclined screen lending support to the debris as it is pushed upwardly, and thus preventing, or inhibiting, the fall of the debris over the scraper back into the screen. The actual removal of the debris is effected by a scraper 51 equipped with a rubber or other relatively soft blade 52 which contacts the screen with a squeegee action. The blade and scraper have an arcuately convex contour to match closely the arcuately concave contour of the upstream side of the screen over which the blade moves. It is contemplated that the blade will be pivotally mounted on a reciprocating guide in such manner that it will be rigidly supported with its plane normal to the screen during the upward, debris-scraping movement thereof, and will be rotated through 90° and so held during its downward, non-scraping movement. At the bottom of the downward stroke, the blade and scraper are rotated back through 90° into wiping contact with the bottom plate 48 in preparation for the upward stroke.

The debris is pushed upwardly over the screen 47 and top plate 49 and then over a laterally curved portion 52' at the upper end of the top plate 49 whence it falls upon a belt conveyor 53 which carries it to an appropriately arranged disposal point (not shown). Said conveyor is preferably arranged to carry the debris transversely of channel 50, and the conveyor may operate continuously as long as scraper 51 is reciprocated over screen 47.

The reciprocation of scraper 51 is effected by one or more rods 54 to which scraper 51 is secured in a manner hereinafter to be described. Rods 54, in turn, are moved back and forth by a reciprocator designated generally by reference character 55, a preferred form of which is also hereinafter described in detail.

It may be observed that the resistance created by screen 47 and plates 48, 49 to the movement of the stream causes the level of the stream on the upstream side 56 of the screen to be higher than that on the downstream side 57. This difference in level creates a pressure differential across the screen which is utilized to clear the interstices of the screen of occluded debris. If, however, the debris is of a pasty nature such that the available pressure head is not sufficient to effect the desired clearing of the screen, an auxiliary back-flushing device 58 may be used. The back-flushing device 58 may be comprised of a transversely disposed bar 59 having a chamber 60 therein coextensive with the screen 47 and having closely spaced aligned openings 61 (FIG. 11) directed toward the back of the screen. Alternatively, a single slot may be used in place of a plurality of openings. Bar 59 is secured to one or more tubes 62 which are connected to rod 54 by a tie rod 63 so as to be reciprocated therewith. The interior of tube 62 is in communication with chamber 60 at its lower end and is in communication, through a flexible hose 64, with a source of fluid under pressure, preferably the liquid taken from downstream side 57. Bar 58 is supported on suitable guides 65 with the outer ends of openings 61 in close proximity to screen 47 so that the fluid under pressure in chamber 60 and openings 61 will impinge upon screen 47 and particularly upon the occluded debris in the interstices thereof to force said debris back into the upstream side 56.

Bar 58 is held just below scraper 51 so that it follows said scraper as the latter moves upwardly over the screen. Because of the closeness of the bar 59 to the screen and to the scraper, the arcuate screen contour is maintained by these relatively rigid members and distortion of the screen by the pressure of the fluid impinging thereon is averted. Since the scraper is lifted from the screen on the down stroke, a valve 66 is inserted in the tube 62 and is provided with an operating lever 67 arranged to strike a shut-off stop 68 at the upper end of its upward stroke and a turn-on stop 68 at the bottom of its downward stroke, so that no pressure is exerted upon the unsupported screen during the return stroke of the scraper.

Another useful adjunct for cleaning off sticky or pasty occluded material is to prevent flow through the screen immediately in advance of the squeegee 52, by a pressure equalizer which eliminates the pressure differential across the screen and minimizes the entry of the debris into the interstices of the screen. Such equalizer is shown at 70 in FIG. 11. It is comprised of a bar 71 having a transverse chamber 72 and a channel 73 facing the screen, the legs 74 of the channel preferably being made of resilient material and conformed to and in contact with the convex arcuate of the downstream side of the screen 47. This provides a barrier for the fluid immediately adjacent the tip 75 of the squeegee 52 and hence prevents flow therethrough. The pressure on both sides of screen 47 is thus equalized and the tendency to press the debris into the interstices is minimized.

Under some conditions it may be advantageous to increase the pressure in the channel 73 slightly over the pressure in the upstream side 56 to lift the debris slightly away from the screen and make it easier for the squeegee to remove the debris from the screen without wiping it over the interstices. For this purpose, several small openings 76 may be made in bar 71 establishing communication between chamber 72 and channel 73. Care must be exercised, however, to keep the flow low enough to avoid breaking up the caked debris by the reversed pressure differential and remixing such debris with the water on the upstream side.

The pressure equalizer 70 may be used along with the back-flushing device 58, in which event it is necessary to connect chamber 72 with chamber 60 through appropriate passages 77.

Figure 9:
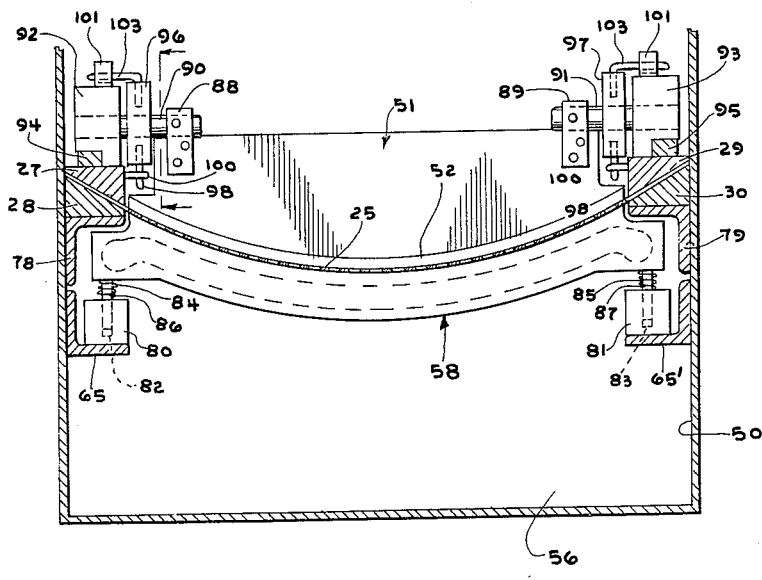
FIG. 9 is an enlarged transverse section through the screen and cleaning assembly of FIG. 8.
Figure 10:
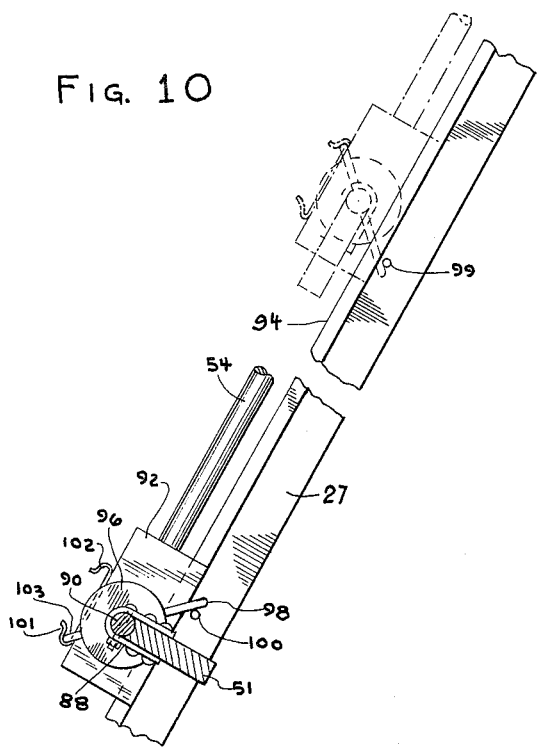
FIG. 10 is a side elevational view of the scraper control for the assembly of FIG. 9.

The details of construction of the scraper, its controls and the back flushing device are shown more clearly in FIGS. 9 and 10. Screen clamping guides 27, 28 and 29, 30 are mounted on angle irons 78, 79 secured to the opposite sides of channel 50 at the angle to the vertical shown for screen 47 in FIG. 8. Below angle irons 78 and 79, and parallel therewith, are mounted angle irons 65 and 65', which serve as guides for the back-flushing bar 58. Said bar is preferably supported on guides 65 and 65' through slides 80, 81, each of which has a drilled opening 82, 83, respectively, in which are received pins 84, 85 secured to bar 58 and around which are placed compression springs 86, 87 which serve to hold bar 58 resiliently against the screen 25, and the latter, because of its fineness and hence flexibility, against the curved flexible squeegee portion 52 which maintains the arcuate form in the screen.

Scraper 51 is secured by straps 88, 89 to axially aligned shafts 90, 91, respectively, extending laterally in opposite directions from the top of scraper 51. Said shafts 90, 91 are pivotally mounted in slides 92, 93 riding on side rails 94, 95 secured to the tops of clamping guide members 27 and 29, respectively. Rigidly secured to shafts 90 and 91 intermediate the straps and slides are scraper angle controls 96, 97, each such control having a lower arm 98 disposed to contact an upper stop 99 and a lower stop 100 at the ends of the reciprocations of the scraper over the screen. Said lower arms and stops are so related angularly with respect to scraper 51, that stop 100 will turn scraper in its slides 92, 93 so that its plane is normal to the screen to effect a cleaning operation thereon, and its plane is turned to be parallel with rails 94, 95 and spaced from screen 25 by the stop 99 for the downward return movement of the scraper.

The scraper 51 is resiliently held in its two extreme positions by spring clips 101, 102 mounted on each slide and cooperating with a latch member 103 secured to the angle controls 96, 97. Said slips are of sufficient strength to hold the scraper in either one of its two positions under normal conditions, but will release the scraper at the ends of the stroke or under abnormal conditions. Thus, if the scraper encounters an unusual resistance in its upward cleaning movement, it will automatically be released to prevent damage to itself and to its associated guides and reciprocating mechanism.

A preferred form of reciprocating mechanism 55 is shown in greater detail in FIGS. 12, 13 and 14. Because of the long stroke required, an endless chain type of reciprocator has been found to be most satisfactory. The reciprocator 55 is accordingly comprised of a frame made of weldments such as an inverted channel 104 across the ends of which are welded plates 105, 106. Below and on both sides of channel 104 are disposed parallel guide rods 107, 108, the ends of which are secured to plates 105 and 106, and on guide rods 107, 108 is slidable a carriage 109. Said carriage 109 is provided with laterally and oppositely extending ears 110, 111 which are secured to the upper ends of the rods 54, the lower ends of which rods are secured to the slides 92, 93 for scraper 51. Thus, reciprocation of carriage 109 on guide rods 107, 108 results in reciprocation of scraper 51 over screen 25. Long bushings 112, 113 secured to plate 105 serve to guide rods 54 in their reciprocating movement relative to the frame.

The reciprocation of carriage 109 is effected by an endless chain 114 which passes over sprockets 115, 116 mounted on parallel shafts 117, 118, respectively, rotating in bearings 119, 120 secured to channel frame member 104. One of said shafts, 117, is adapted to be connected to a motor, preferably through suitable reduction gearing (not shown). One of the links of the chain 114 has secured thereto on opposite sides thereof a pair of axially aligned rollers 121, 122. Roller 122 is received between parallel bars 123, 124 constituting a portion of carriage 109, said bars being secured to carriage guides 125, 126 sliding on guide rods 107, 108. Roller 121 is received between parallel bars 127, 128 (FIGS. 13, 14), likewise constituting a portion of carriage 109 and secured to guides 125, 126. Because of the presence of shafts 117 and 118 which extend into the path of movement of bars 127, 128, the latter have slots 129, 130 cut through them to allow the carriage to pass said shafts. The slots, however, present an interrupted path for roller 121 and move the support therefrom which would result in the creation of an eccentric force in the chain link as the roller went around the sprockets.

To obviate the above-mentioned eccentric forces, two additional rollers 131, 132, mounted on a bracket 133 pivoted on the pin 134 about which roller 121 rotates, are provided, one disposed on either side of roller 121. It is thus contemplated that when one roller is aligned with slots 129, 130 and hence unsupported, the other two rollers will be supported between bars 127, 128 and will provide the necessary balance for roller 122.

It may be apparent that as shaft 117 is rotated, sprocket 115 will also be rotated and hence chain 114 and sprocket 116 will be driven. The rollers 121, 122, 131 and 132 will be constrained to move with the chain and will therefore move carriage 109 with them. The movement of the chain around the sprockets 115, 116 will result in a reciprocating movement of carriage 109 on its guide rods 107, 108.

In FIGS. 15, 16 and 17, the invention is shown as applied to a trash remover in a pipe line. In these figures, the upstream pipe is shown at 134', the downstream side at 135 and the trash remover is designated generally by the reference character 136. The latter is comprised of a substantially rectangular inclined chamber 137 which is divided by a trash screen 138 into an inlet chamber 139 and an outlet chamber 140. The bottom of inlet chamber 139 is curved upwardly and blends into the arcuate contour of the trash screen 138, forming a solid plate 141 at the lower end of the trash screen. The latter may have the form and construction of the screen shown in FIGS. 5, 6 and 7.

Since the trash to be removed is bulky, it is not desirable to raise the scraper off the screen during the down stroke because a large piece of debris may find its way under the scraper at the point where the latter is lowered upon the screen and prevent the scraper from contacting the screen as intended. The mechanism for turning the scraper to raise its lower or squeegee edge from the screen is eliminated from the FIG. 15 modification, and the scraper is continuously in contact with the screen, whether moving debris up or returning downwardly. Although it would appear that the downward movement would tend to push the debris back into the stream, it may be observed that the scraper 142 is not at right angles to its rod 143 and its direction of motion, but is inclined backwardly with reference to such direction. Furthermore, it may be noted that the curved bottom plate 141 directs the stream upwardly along the screen. The angular disposition of scraper cooperates with the upwardly moving stream to cause loosened debris to slide up over scraper 142 and fall behind it upon the screen, rather than to fall back into the stream. Where the debris is of a cakey nature, it may form into a roll ahead of scraper 142 until the bottom of the chamber is reached, where the upwardly directed stream lifts the rolled debris and pushes it over and behind the scraper.

Since the pipe 134 may be some distance underground, it is necessary to lift the debris from the trash remover chamber to a conveyor 144 located above ground. A trash chute 145 is therefore inserted above the trash remover 136 and it is contemplated that scraper 142 will be pulled at least partly into said trash chute by the reciprocator 55. It is not required, for effective removal of the trash, that the scraper 142 traverse the entire length of the trash chute, since the angle of the chute is such as to inhibit retrograde movement of the elevated trash upon the screen. Each upward stroke of the scraper will advance the trash a part of the distance to the top or discharge end 146 of the trash chute, and the trash will eventually move out of the discharge end 146 of the chute.

Where the debris is largely an agglomeration of heterogeneous trash, the bottom of chute 145 may be formed with ratchet-type teeth 147 which help to hold the debris against return movement into chamber 139. A further problem may arise in connection with particularly large trash such as branches, etc., which cannot be forced into chute 145. Such debris might well damage the scraper, chute, reciprocator and the drive therefor. To avoid the possibility of such damage, rod 143 is not connected directly to the rods 54 of the reciprocator 55, but is separated therefrom by a resilient connection 148. In the form chosen to illustrate such connection, it is comprised of a tension spring 149 (FIG. 17), one end 150 of which is secured to scraper rod 143 and the other end 151 of which is secured to reciprocator rod 54 so that the pull of the reciprocator is taken through spring 149. It is understood that two such scraper rods and reciprocator rods are used with scraper 143, and that the scraper and reciprocator rods telescope one into the other for rigidity. Suitable stop means, not shown, may be used to prevent the scraper and reciprocator rods from compressing the spring on the down stroke to its solid height to avoid permanent damage to the spring.

When the reciprocator reverses the motion of the scraper from upward to downward, any obstruction in the chute will be released and the cause of the trouble will alter its position, either by the movement of the rod or the movement of the current, and will tend to move against the screen and away from the top of the chute. After several reciprocations of the scraper, the troublesome branch will be broken or bent and forced through the chute.

Figure 19:
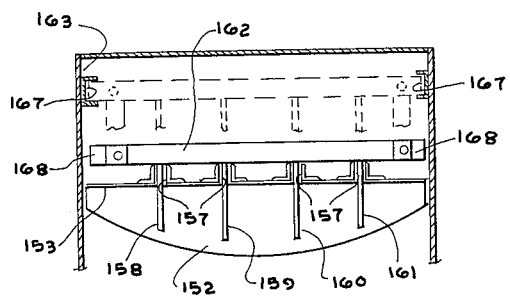
FIG. 19 is a cross-section through the modification of FIG. 18 taken along the line 19—19 thereof and looking upward.

For very long chutes, or where the trash does not pass readily up the trash chute, the form of chute shown diagrammatically in FIGS. 18 and 19 may be used. In this form the chute 152 has ratchet type teeth 153, formed in the floor 154 thereof, and similar teeth 155 formed in, and extending inwardly from, the roof 156 of the chute. Roof 156 is formed with a series of parallel slots 157, through which extend the tines 158, 159, 160, 161 of a rake 162 disposed in a chamber 163 immediately above chute 152. Rake 162 is operated by a pair of pull rods 164 (only one of which is shown) pivoted to rods 165 secured to the scraper rod 143 by a transverse arm 66 so that the rake is reciprocable with the scraper.

An alternate raising and lowering movement is given rake 162 by a track-and-follower mechanism which includes channels 167 disposed parallel to scraper rod 143 and roller followers 168 on the rake, riding at times in said channels and guided thereinto by angularly disposed approach channels 169. A weighted pivoted gate 170 blocks reentry of the rollers into the approach channels from the channels 167. In operation, rake 162 is lowered upon the toothed floor 152 by gravity and contacts any trash which may be at the bottom of the chute. The rake and scraper are pulled upwardly by the reciprocator 55, thereby pulling the trash with it. Near the end of its upward stroke rollers 168 contact and enter approach channels 169, up which they ride, pushing open gate 170, and enter channels 167. As the rollers ride up approach channels 169, rake 162 is raised substantially out of chute 152 into chamber 163. Gate 170 closes behind the rollers so that when the direction of the rake and scraper is reversed, the rollers now ride in channels 167, thereby holding the rake in its elevated position. When the rollers leave the end of channels 167, the tines of the rake fall into chute 152 and are held there by gravity during the next upward stroke.

The form of scraper and method of handling trash shown as used with a pipeline in FIG. 15 may also be adapted for use with an open channel such as in FIG. 8. When so used, the trash chute is dispensed with. Such open channel construction is shown in FIGS. 20 and 21.

Figure 20:
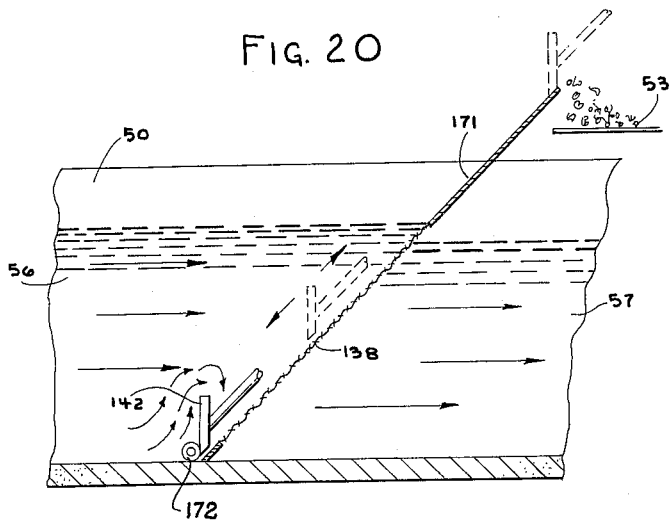
FIG. 20 is a diagrammatic side elevational view of still another modification of the scraper assembly.

In the FIG. 20 form, the trash chute has been replaced by a plate 171 which may extend downwardly to approximately the low water level of the channel. In place of the upwardly curved channel bottom of FIG. 15 by which is obtained the upwardly directed flow desired for pushing debris over the scraper, a jet 172 of high pressure water is directed against the scraper 142 to produce the same effect. It is desirable, however, that the jet be present only while the scraper 142 is at the bottom of the channel to avoid repelling the debris or trash from the screen. To effect such timed shut-off, a valve 173 may be used, said valve having a shut-off handle 174 operated by some part of the reciprocating mechanism or the rods driven thereby after the manner disclosed in FIG. 8.

Figure 21:
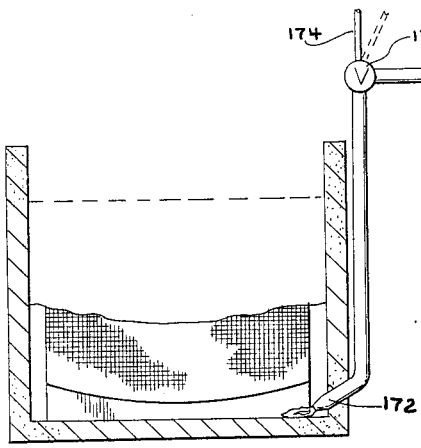
FIG. 21 is a cross-section, on an enlarged scale, of the modification of FIG. 20.

The form shown in FIGS. 20 and 21 has several advantages in that no adjustment need be made between low and high water conditions in the channel, and less damage results from contact with the large heavy floating trash since such trash will strike the plate 171 rather than the screen 138.

It is understood that the foregoing description is merely illustrative of preferred embodiments of the invention and that the scope of the claims is not to be limited thereto, but is to be determined by the appended claims.

We claim:
1. In combination with an elongated channel for a flowing stream of liquid containing undesirable debris, said channel including a bottom and sides, means for removing undesirable debris from a flowing stream of liquid, said means comprising an arcuate screen having a top, a bottom, two sides, a concave surface and a convex surface, said screen being positioned in said channel with said concave surface facing upstream and said convex surface facing downstream with said screen's arcuate cross-section lying in a plane normal to the sides of said elongated channel, frame means, said screen being rigidly fixed to said frame means along each side of said screen for resisting upstream and downstream movement of said screen and its sides with respect to said frame means, said frame means and said arcuate screen extending across said channel and between said channel sides to form a perforate barrier thereacross, a scraper having a convex scraping surface parallel to said arcuate cross-section of said arcuate screen for scrapitng and wiping the concave upstream side of said arcuate screen, and means for bodily moving the convex scraping surface of said scraper along and against the concave upstream surface of said arcuate screen between the sides of said screen from a position adjacent the bottom of said screen to a position adjacent the top of said screen and for bodily returning said scraper to a position adjacent the bottom of said screen while said scraper is out of contact with said screen.

2. The combination of claim 1 in which said arcuate screen is a perforate plate.

3. The combination of claim 1 in which said arcuate screen is a wire cloth screen.

4. The combination of claim 1 in which said arcuate screen is comprised of a plurality of thin parallel upwardly extending elongated strips.

5. The combination of claim 1 in which an arcuate plate is secured to said frame at the bottom of said screen and is positioned adjacent the bottom of said channel and in which an arcuate plate is secured to the frame at the top of said screen.

6. The combination described in claim 1, said means for bodily moving the scraper comprising a reciprocating mechanism including a pivoted support for the scraper adapted to hold said scraper against the screen in one position and to hold said scraper away from said screen in another position, and means automatically operable upon movement of the pivoted support toward the channel bottom to hold said scraper away from said screen and upon movement of the pivoted support away from said channel bottom to hold said scraper against said screen.

7. The combination described in claim 1, and means confronting the convex surface of said screen and movable with the scraper for equalizing the pressure of the liquid on opposite surfaces of the screen immediately adjacent the scraper, and means for rendering the equalizing means ineffective while the scraper is moving toward the channel bottom.

8. The combination described in claim 1, said channel having a bottom portion which is curved upwardly adjacent the screen to provide an upwardly directed stream at the bottom of said screen, and means for moving said scraper downwardly along said screen toward said channel bottom whereby debris removed from the screen by the scraper and moving downward along the screen ahead of said scraper is forced upward over said scraper to be moved by said scraper upon the upward movement of said scraper.

9. The combination described in claim 1, said means for moving the scraper along said concave side of the screen including a resilient, yieldable connection, whereby said scraper moving means is adapted to function despite blocking of the scraper movement by trash.

10. In combination with an elongated channel for a flowing stream of liquid containing undesirable debris, said channel including a bottom and sides, means for removing undesirable debris from a flowing stream of liquid, said means comprising a shallow arcuate screen having a top, a bottom, two sides, a concave surface and a convex surface, said screen being positioned in said channel with said concave surface facing upstream and said convex surface facing downstream and with said screen's arcuate cross-section lying in a plane normal to the sides of said elongated channel, frame means, said screen being rigidly fixed to said frame means along each side of said screen for resisting upstream and downstream movement of said screen and its sides with respect to said frame means, said frame means and said arcuate screen extending across said channel and between said channel sides to form a perforate barrier thereacross, a scraper having a convex scraping surface parallel to said arcuate cross-section of said arcuate screen for scraping and wiping the concave upstream side of said arcuate screen, and means for bodily moving the convex scraping surface of said scraper along and against the concave upstream surface of said arcuate screen between the sides of said screen from a position adjacent the bottom of said screen to a position adjacent the top of said screen and for bodily returning said scraper to a position adjacent the bottom of said screen while said scraper is out of contact with said screen.

(References on following page)

References Cited by the Examiner

UNITED STATES PATENTS

| | | | |
|---|---|---|---|
| 1,357,499 | 11/20 | Hunt | 210—162 X |
| 1,554,376 | 9/25 | Schrag | 15—93 |
| 1,565,068 | 12/25 | Ebright | 15—93 |
| 1,773,576 | 8/30 | Downes | 210—154 |
| 1,794,504 | 3/31 | Van Norman | 210—162 |
| 1,823,823 | 9/31 | Dundas et al. | 210—159 |
| 1,874,125 | 8/32 | Schofield et al. | 210—159 |
| 2,020,728 | 11/35 | Kinsey | 210—159 |
| 2,033,653 | 3/36 | Schlapak et al. | 210—159 |
| 2,696,308 | 12/54 | Martin | 210—159 |
| 2,790,750 | 4/57 | Eyre | 210—152 |
| 2,929,504 | 3/60 | Lind et al. | 210—162 X |
| 2,963,156 | 12/60 | Nordell | 210—159 |

FOREIGN PATENTS 406,953  3/23  Germany.

REUBEN FRIEDMAN, *Primary Examiner.*

HARRY B. THORNTON, HERBERT L. MARTIN,
*Examiners.*